US008867246B2

(12) United States Patent
Abe et al.

(10) Patent No.: US 8,867,246 B2
(45) Date of Patent: Oct. 21, 2014

(54) COMMUNICATION DEVICE AND BATTERY PACK IN WHICH THE COMMUNICATION DEVICE IS PROVIDED

(75) Inventors: Shuhei Abe, Tokyo (JP); Akira Ikeuchi, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 722 days.

(21) Appl. No.: 13/122,577

(22) PCT Filed: Oct. 7, 2009

(86) PCT No.: PCT/JP2009/067491
§ 371 (c)(1),
(2), (4) Date: Apr. 5, 2011

(87) PCT Pub. No.: WO2010/052989
PCT Pub. Date: May 14, 2010

(65) Prior Publication Data
US 2011/0187343 A1     Aug. 4, 2011

(30) Foreign Application Priority Data
Nov. 5, 2008   (JP) ................................ 2008-284765

(51) Int. Cl.
*H02M 3/24*     (2006.01)
*H02M 7/44*     (2006.01)
*G06F 1/30*     (2006.01)

(52) U.S. Cl.
CPC ...................................... *G06F 1/305* (2013.01)
USPC .......................................................... 363/97

(58) Field of Classification Search
USPC ........... 363/65, 97–98, 124, 131–132, 50, 55, 363/56.01; 323/224, 273, 282
See application file for complete search history.

(56) References Cited

U.S. PATENT DOCUMENTS

| 6,744,234 | B2 | 6/2004 | Odaohhara et al. | |
| 2003/0141847 | A1* | 7/2003 | Fujiwara | 320/134 |
| 2004/0070375 | A1* | 4/2004 | Formanek | 323/225 |
| 2005/0057216 | A1* | 3/2005 | Yamaguchi et al. | 320/106 |
| 2006/0012337 | A1* | 1/2006 | Hidaka et al. | 320/119 |

(Continued)

FOREIGN PATENT DOCUMENTS

| JP | 07-123600 | 5/1995 |
| JP | 2003-092841 | 3/2003 |

(Continued)

OTHER PUBLICATIONS

International Search Report mailed on Dec. 22, 2009.

*Primary Examiner* — Adolf Berhane
*Assistant Examiner* — Jeffrey Gblende
(74) *Attorney, Agent, or Firm* — IPUSA, PLLC

(57) ABSTRACT

A communication device, includes a CMOS type inverter configured to transfer a signal, the signal being transferred and received between an electronic device and a control part able to communicate with the electronic device whose electric power supply is a rechargeable battery; and a regulator configured to generate a regulated voltage, the regulated voltage being formed by decreasing an electric power supply voltage of the electronic device, wherein the regulator includes a depletion type NMOS transistor where a drain is connected to a high electric potential side of the electric power supply voltage and a gate and a source are mutually connected, and a capacitive element having an electrode connected to the source side and another electrode connected to a low electric potential side of the electric power supply voltage, wherein a voltage of the capacitive element is supplied across both ends of the inverter.

6 Claims, 5 Drawing Sheets

(56) References Cited

U.S. PATENT DOCUMENTS

| | | | |
|---|---|---|---|
| 2006/0014573 A1* | 1/2006 | Wuidart | 455/572 |
| 2006/0119315 A1 | 6/2006 | Sasaki et al. | |
| 2006/0119316 A1 | 6/2006 | Sasaki et al. | |
| 2007/0145951 A1* | 6/2007 | Hidaka et al. | 320/134 |
| 2007/0188135 A1 | 8/2007 | Odaohhara | |
| 2008/0106309 A1* | 5/2008 | Abe | 327/143 |
| 2009/0001904 A1* | 1/2009 | Okawa | 315/291 |

FOREIGN PATENT DOCUMENTS

| | | |
|---|---|---|
| JP | 2006-164547 | 6/2006 |
| JP | 2006-344611 | 12/2006 |
| JP | 2007-215251 | 8/2007 |

* cited by examiner

US 8,867,246 B2

COMMUNICATION DEVICE AND BATTERY PACK IN WHICH THE COMMUNICATION DEVICE IS PROVIDED

TECHNICAL FIELD

The present invention generally relates to communication devices and battery packs in which the communication devices are provided. More specifically, the present invention relates to a communication device and a battery pack in which the communication device is provided, the communication device including an inverter including a CMOS configured to transfer a signal being sent and transferred between a control part monitoring a status of a rechargeable battery feeding power to an electronic device and the electronic device.

BACKGROUND ART

Conventionally, a device discussed in the following Patent Document 1 or Patent Document 2 has been known as a device configured to communicate between a main part and an electric power supply part detachably provided and configured to supply electric power to the main part.

A CMOS inverter has been known as a communication interface circuit between such a main part and the electric power supply part. FIG. 1 is a structural view of the CMOS inverter. The CMOS inverter includes a P channel MOS transistor and an N channel MOS transistor. An input VIN is provided as a common gate. An output VOUT is provided as a common drain. A source of the N channel MOS transistor is connected to a ground line VSS. A source of the P channel MOS transistor is connected to an electric power voltage line VDD. In the CMOS inverter, when an H level voltage is input to the VIN, conductivity of the N channel MOS transistor is made so that a L level voltage is output. When an L level voltage is input to the VIN, conductivity of the P channel MOS transistor is made so that an H level voltage is output.
[Patent Document 1] Japanese Patent Application Laid-Open Publication No. 7-123600
[Patent Document 2] Japanese Patent Application Laid-Open Publication No. 2003-92841

DISCLOSURE OF THE INVENTION

Problems to be Solved by the Invention

However, in a case where communication is made between the main part and the electric power supply part, if an electric power voltage between P positive and P negative is changed, a signal sent to and transferred from the electric power supply part may not pass through the CMOS inverter. In order to make this communication signal pass, a voltage which is a half of the voltage between P positive and P negative, as an amplitude voltage of the communication signal, is required. However, if an amplitude voltage of the communication signal from the main part becomes equal to or less than the voltage between P positive and P negative, an error operation happens so that a correct communication signal is not transferred.

Means for Solving Problems

Accordingly, embodiments of the present invention may provide a novel and useful communication device and battery pack in which the communication device is provided, solving one or more of the problems discussed above.

More specifically, the embodiments of the present invention may provide a communication device and a battery pack in which the communication device is provided, the communication device being configured to prevent an error operation of a CMOS type inverter with a simple structure even if an electric power voltage is changed.

One aspect of the present invention may be to provide a communication device, including a CMOS type inverter configured to transfer a signal, the signal being transferred and received between an electronic device and a control part able to communicate with the electronic device whose electric power supply is a rechargeable battery; and a regulator configured to generate a regulated voltage, the regulated voltage being formed by decreasing an electric power supply voltage of the electronic device, wherein the regulator includes a depletion type NMOS transistor where a drain is connected to a high electric potential side of the electric power supply voltage and a gate and a source are mutually connected, and a capacitive element having an electrode connected to the source side and another electrode connected to a low electric potential side of the electric power supply voltage, wherein a voltage of the capacitive element is supplied across both ends of the inverter.

Another aspect of the present invention may be to provide a battery pack, including the above-mentioned communication device; and the rechargeable battery, wherein the communication device and the rechargeable battery are provided in the battery pack.

Additional objects and advantages of the embodiments will be set forth in part in the description which follows, and in part will be obvious from the description, or may be learned by practice of the invention. The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

Effect of the Invention

According to the embodiment of the present invention, even if an electric power voltage is changed, an error operation of a CMOS type inverter can be prevented with a simple structure.

MODE FOR CARRYING OUT THE INVENTION

Figure 1:
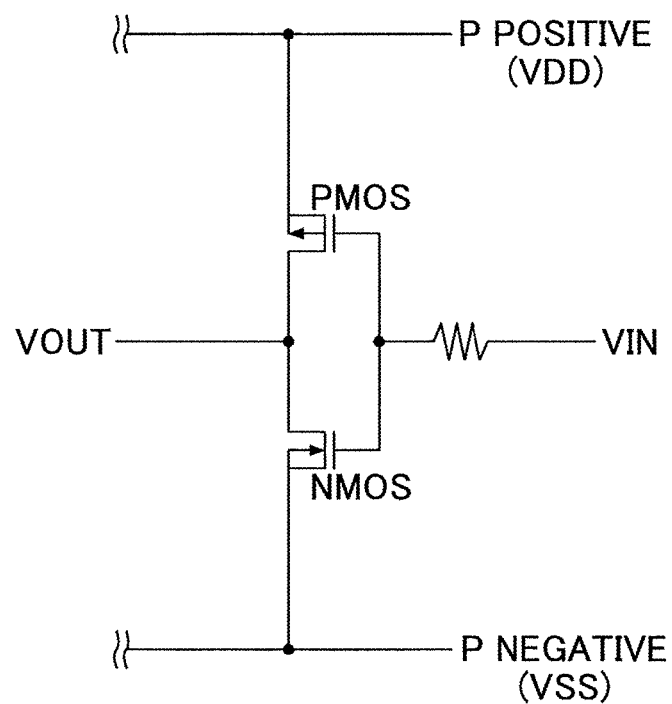
FIG. 1 is a structural view of a CMOS inverter.
Figure 2:
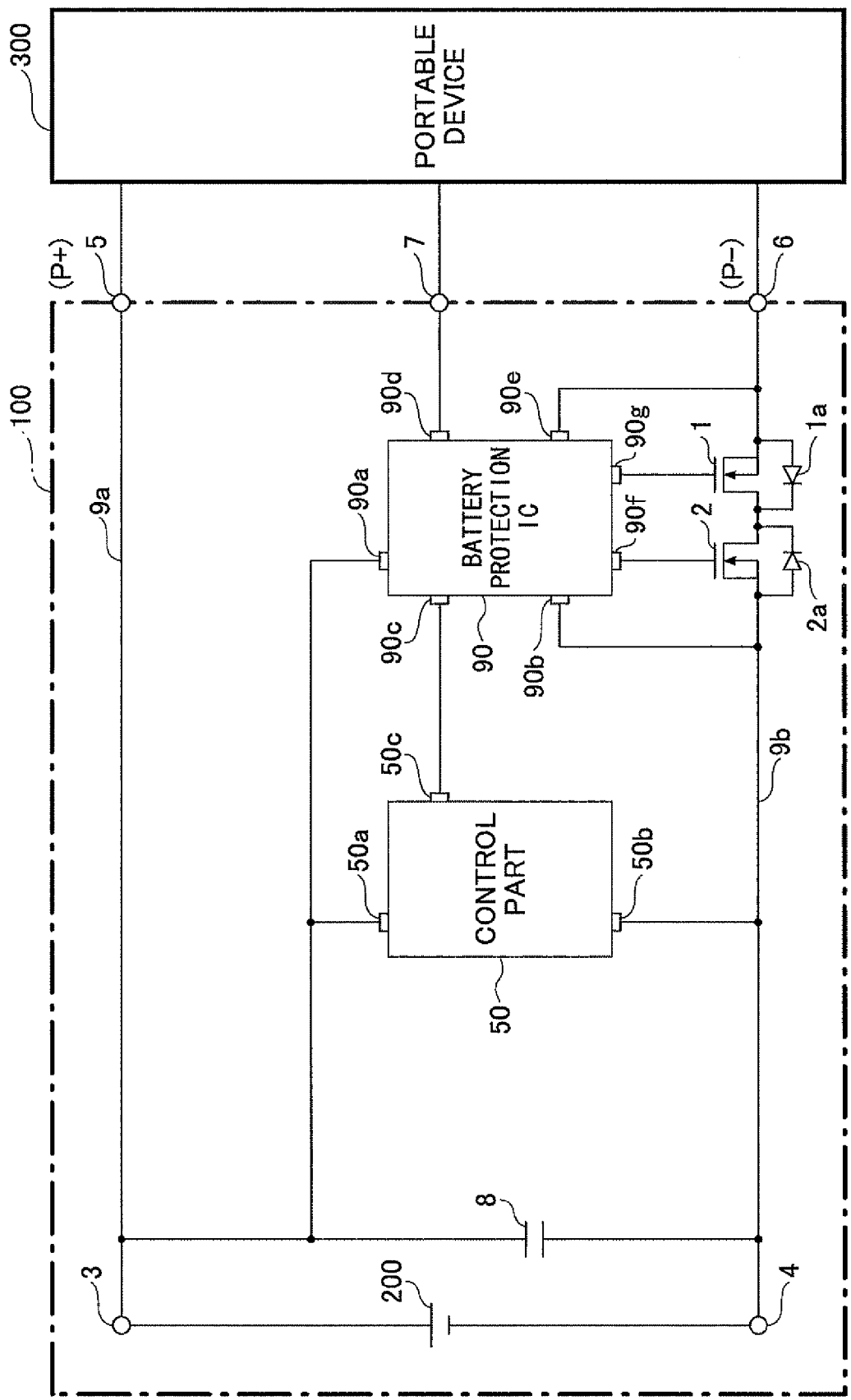
FIG. 2 is an entire structural view of a battery pack 100 of an embodiment of the present invention.

A description is given below, with reference to FIG. 2 through FIG. 5 of embodiments of the present invention.
FIG. 2 is an entire structural view of a battery pack 100 of an embodiment of the present invention. The battery pack 100 is a module component in which a battery protecting device and a rechargeable battery 200 are provided. The battery protecting device includes switching elements 1 and 2, a battery protection IC 90, and a control part 50.

Here, the switching elements 1 and 2 are configured to switch conductivity/break a charge and discharge path 9 (9a, 9b) between input and output terminals 5 and 6 and bipolar terminals 3 and 4 of the rechargeable battery 200. The input and output terminals 5 and 6 are used for discharging to a portable device 300 where the rechargeable battery 200, such as a lithium ion battery, a nickel-hydrogen battery, or an electric double layer capacitor, is used as an electric power supply and used for charging by a charger (not illustrated) of the rechargeable battery 200.

The battery protection IC 90 is configured to control switching operations of the switching elements 1 and 2. The control part 50 is configured to monitor battery information such as a battery status or the like regarding the rechargeable battery 200.

The control part 50 may be provided in the battery protection IC 90. The control part 50 provided in the battery protection IC 90 may control the switching operations of the switching elements 1 and 2.

The battery pack 100 may be provided in or externally provided to the portable device 300. The portable device 300 is an electronic device which can be carried by a human. More specifically, the portable device 300 may be, for example, a portable phone having a wireless communication function, an information terminal device such as a PDA or a mobile personal computer, a camera, a game device, a music or video player, or the like.

The battery pack 100 is detachably connected to the portable device 300 via input and output terminals (positive pole input and output terminal 5 and negative pole input and output terminal 6) and a communication terminal 7. The positive pole input and output terminal connected to a positive pole terminal at the portable device 300 side is electrically connected to the positive pole 3 of the rechargeable battery 200 via the charge and discharge path 9a. The negative pole input and output terminal 6 connected to a negative pole terminal at the portable device 300 side is electrically connected to the negative pole 4 of the rechargeable battery 200 via the charge and discharge path 9b. The communication terminal 7 connected to a connecting terminal of the portable device 300 side is connected to the terminal 90d of the battery protection IC.

The switching elements 1 and 2 are connected to each other in series, so that conductivity/breaking of the charge and discharge path 9b between the negative pole 4 of the rechargeable battery 200 and the input and output terminal 6 can be switched. The switching element 1 is a first switching part configured to switch conductivity/breaking of the charge of a charging electrical current of the rechargeable battery 200 flowing in the charge and discharge path 9 in a charging direction. The switching element 2 is a second switching part configured to switch conductivity/breaking of the charge of a discharging electrical current of the rechargeable battery 200 flowing in the charge and discharge path 9 in a discharging direction. When the switching element 1 is turned on, charging the rechargeable battery 200 is permitted. When switching element 1 is turned off, charging the rechargeable battery 200 is prevented. When the switching element 2 is turned on, discharging the rechargeable battery 200 is permitted. When switching element 2 is turned off, discharging the rechargeable battery 200 is prevented.

The switching elements 1 and 2 are, for example, semiconductor elements such as IGBTs or MOSFETs having a parasitic (body) diode. The switching element 1 is provided between the negative pole 4 and the negative pole input and output terminal 6, so that a forward direction of a parasitic (body) diode 1a is the same as the discharging direction of the rechargeable battery 200. The switching element 2 is provided between the negative pole 4 and the negative pole input and output terminal 6, so that a forward direction of a parasitic (body) diode 2a is the same as the charging direction of the rechargeable battery 200. The switching elements 1 and 2 may be bipolar transistors where diodes are provided between collector-emitters in a direction indicated by an arrow in FIG. 2.

The control part 50 is configured to communicate with the portable device 300 via the battery protection IC 90. The control part 50 is configured to transfer battery information such as a battery status or the like regarding the rechargeable battery 200 to the portable device 300 and receive a signal such as a command signal from the portable device 300. The control part 50 includes, for example, a temperature detecting part, a voltage detecting part, an AD converter, a calculating processing part, and a memory.

Here, the temperature detecting part is configured to detect a temperature of the rechargeable battery 200. The voltage detecting part is configured to detect a voltage of the rechargeable battery 200. The AD converter includes an electrical current detecting part which detects a charging and discharging electrical current of the rechargeable battery 200 and is configured to convert analog values which are output from each of the detecting parts and which indicate detecting results, into digital values. The calculating processing part is configured to perform calculating processes of remaining capacity of the rechargeable battery 200 or determining processes such as degradation determination of the rechargeable battery 200. The calculating processing part may be formed of, for example, a logic circuit or a microcomputer. The memory is configured to store characteristic data for specifying characteristics of each of components of the rechargeable battery 200 or the battery pack 100 used for the calculating processes and information peculiar to the battery pack 100. The memory may be a storing device such as an EEPROM or a flash memory.

The battery protection IC 90 includes a communication interface circuit. The communication interface circuit is configured to transfer the signal from the control part 50 to the portable device 300 and transfer the signal from the portable device 300 to the control part 50.

Figure 3:
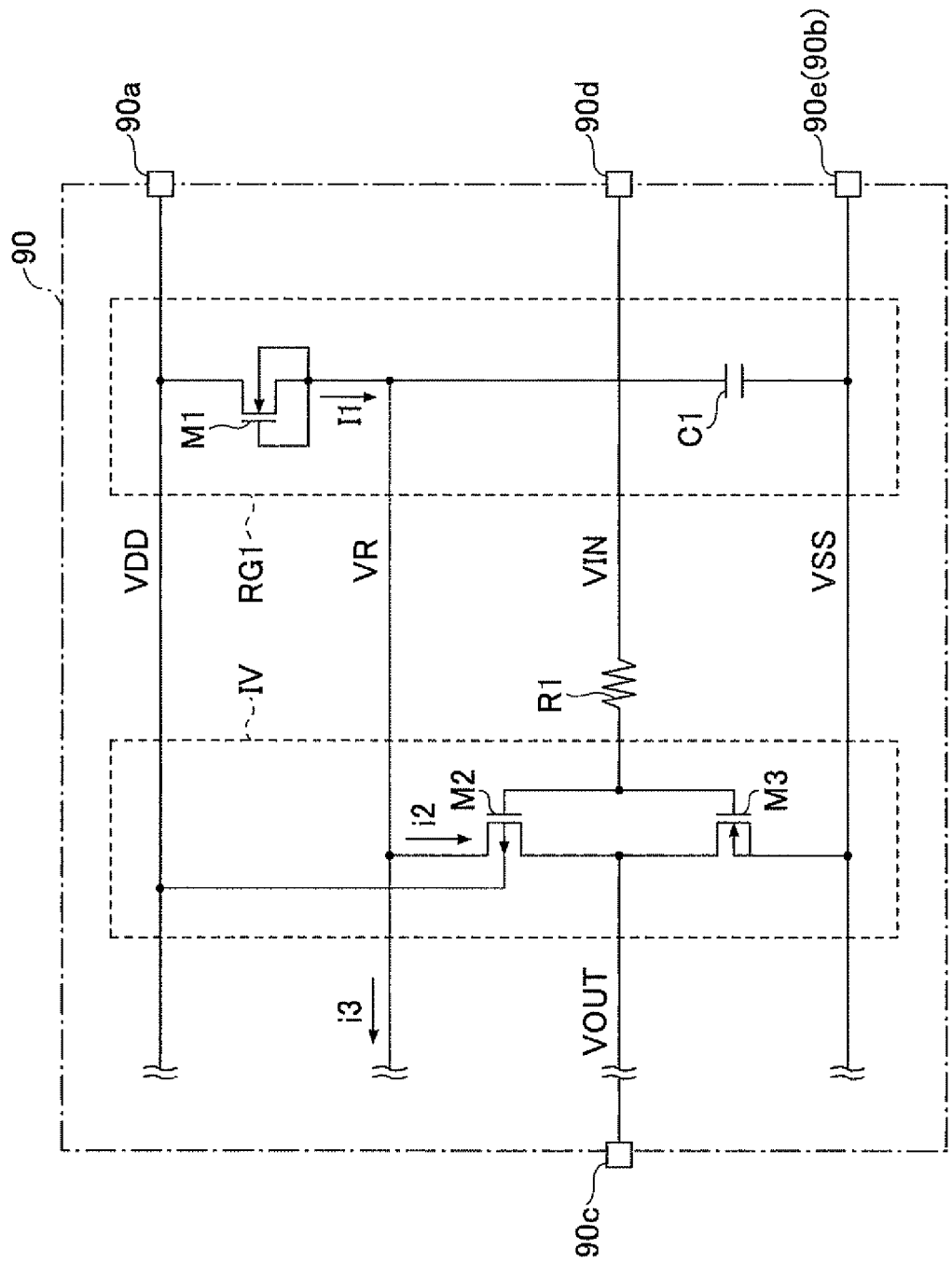
FIG. 3 is a structural view of a battery protection IC 90.

FIG. 3 is a structural view of the battery protection IC 90. The battery protection IC 90 includes a CMOS inverter IV and a regulator RG1. The CMOS inverter IV transfers a signal which is received and transferred between the control part 50 and the portable device 300. The regulator RG1 generates an electric power voltage of the inverter IV by reducing a VDD-VSS voltage between an electric power supply line VDD and a ground line VSS. The VDD-VSS voltage corresponds to an electric power supply voltage applied to the portable device 300 by the rechargeable battery 200. As shown in FIG. 2 and FIG. 3, the electric power supply line VDD has an electric potential equal to that of the positive side input and output terminal 5 via the terminal 90a. The ground line VSS has an electric potential equal to that of the negative side input and output terminal 6 via the terminal 90e. Therefore, the VDD-VSS voltage corresponds to a voltage between the input and output terminals 5 and 6.

The regulator RG1 is formed of a series circuit of the depletion type NMOS transistor M1 and a condenser C1 which is a capacitive element. In the transistor M1, a gate, a source, and a back gate are connected to each other and a drain is connected to the electric power supply line VDD. With this structure, a constant current I1 flows between the drain and the source of the transistor M1. One of electrodes of the condenser C1 is connected to the source of the transistor M1 and another electrode of the condenser C1 is connected to the ground line VSS. A voltage across both ends of the condenser C1 as an electric power supply voltage of the inverter IV is applied across both ends of the inverter IV (between the source of the P channel MOS transistor M2 and the source of the N channel MOS transistor M3) by the electric power supply line VR and the ground line VSS.

The source of the transistor M2 is connected to the electric power supply line VR connected to one of the electrodes of the condenser C1 and the back gate of the transistor M2 is connected to the electric power supply line VDD. This is because since an n-type substrate (clamped to VDD) is used for an IV manufacturing process, even if the back gate has a different electric potential, a short-circuit of the back gate with the VDD is made. In a case where an IC having a triple-well structure or a p-type substrate is used, the back gate of the transistor M2 may be connected to the electric power supply line VR. The source and the back gate of the transistor M3 are connected to the ground line VSS. An input signal from the portable device 300 is input to the common gate of the transistors M2 and M3 via a protection resistor R1 and the terminal 90d. An inverse signal of the input signal from the portable device 300 is output from the common drain of the transistors M2 and M3. With this connecting structure, the input signal from the portable device 300 is transferred to the control part 50 via the terminal 90c.

With this structure of the protection IC 90, the VDD-VSS voltage (for example, 4 V) is decreased to the VR-VSS voltage (for example, 3.3 V) by the transistor M1, so that the condenser C1 is charged by the constant electrical current I1 caused to flow by the transistor M1 and a certain voltage can be formed. A quantity Q of electricity of the condenser C1 can be calculated by the following formula (1), wherein $V_{C1}$ denotes the voltage across both ends of the condenser C1; and $C_1$ denotes a capacitance of the condenser C1.

$$Q = C_1 \times V_{C1} \quad (1)$$

The capacitance of the condenser C1 and the transistor M1 may be designed so that the quantity Q of electricity of the condenser C1 is satisfied with the following formula (2), wherein i2 denotes an electrical current flowing in the inverter IV; i3 denotes an electrical current flowing in a logic circuit such as the CMOS inverter other than the inverter IV; and t denotes a time period during which the electrical currents i2 and i3 flow.

$$Q = C_1 \times V_{C1} > (i2 \times i3) \times t \quad (2)$$

In other words, the capacitance of the condenser C1 and the transistor M1 may be designed so that the quantity Q of electricity of the condenser C1 is sufficiently large relative to an alternating current of a communication signal (H level/L level) being input from the portable device 300 and a necessary voltage as an operating voltage of the inverter IV or other logic circuits can be secured.

The capacitance $C_1$ is, for example, 10 pF. Because of this, it is possible to correspond to load currents i3 and i2 by the quantity Q of electricity of the condenser C1.

Figure 4:
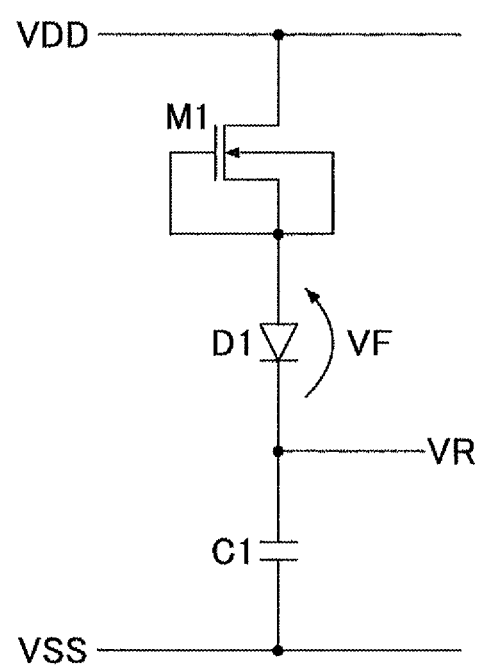
FIG. 4 is a structural view of a regulator RG2 which is another example of a regulator RG1 provided in the battery protection IC 90.

FIG. 4 is a structural view of a regulator RG2 which is another example of the regulator RG1 provided in the battery protection IC 90. A diode D1 where the source side of the transistor M1 functions as an anode is inserted between the transistor M1 and the condenser C1. Depending on the inserting number of the diodes D1 and the VDD-VSS voltage, by using a forward direction voltage VF of the diode D1, it is possible to adjust a certain output voltage value generated by the regulator RG2.

Figure 5:
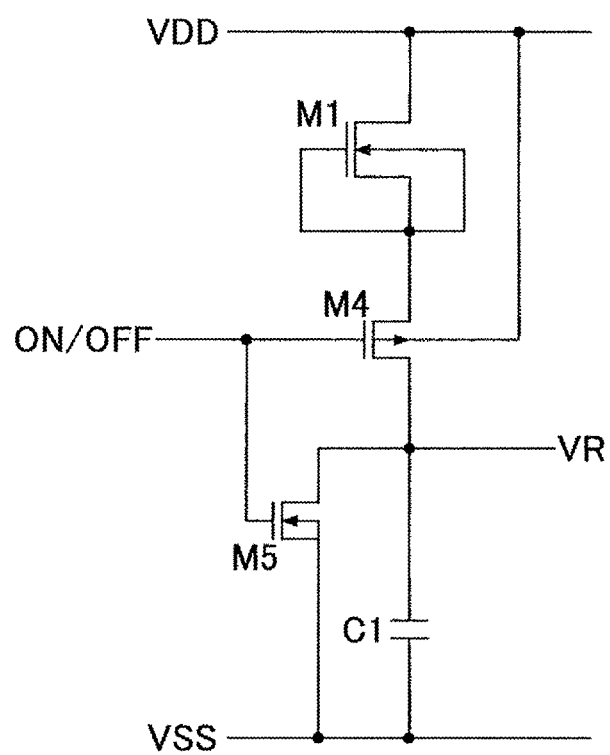
FIG. 5 is a structural view of a regulator RG3 which is another example of the regulator RG1 provided in the battery protection IC 90.

FIG. 5 is a structural view of a regulator RG3 which is another example of the regulator RG1 provided in the battery protection IC 90. A P channel MOS transistor M4, as a blocking part configured to block electric current flow from the transistor M1 to the condenser C1, where the source side of the transistor M1 functions as the source is inserted between the transistor M1 and the condenser C1. The back gate of the transistor M4 may be connected to the electric power supply line VDD. Under this structure, by inputting an on/off signal from an outside to the gate of the transistor. M4, in the electric current flow time period during which the transistor M4 is turned on, it is possible to generate a certain electric power supply voltage of the inverter by the regulator RG3. In the non-electric current flow time period during which the transistor M4 is turned off, it is possible to decrease the consumption of electrical current due to the flow of the electric current from the transistor M1.

In addition, an N channel MOS transistor M5 may be provided, whereby a short-circuit of both ends of the condenser C1 can be made during the blocking time period of the transistor M4. The source of the transistor M5 is connected to the ground line VSS, and the drain of the transistor M5 is connected to a connecting path between the condenser C1 and the transistor M4. By turning on the transistor M5, the discharge of the condenser C1 can be made. In addition, by making the short-circuit of both ends of the condenser C1 in the blocking time during which the transistor M4 is turned off and not making the short-circuit of both ends of the condenser C1 in the conductivity time during which the transistor M4 is turned on, existence and non-existence of output of the regulated voltage can be switched. In the case of the on/off signal being the H level, since the transistor M4 is turned off and the transistor M5 is turned on, the voltages of both ends of the condenser C1 become substantially zero. In the case of the on/off signal being the Z level, since the transistor M4 is turned on and the transistor M5 is turned off, the certain voltage is output from the condenser C1. In addition, with the structures of the transistors M4 and M5 discussed above, existence and non-existence of the output voltage of the regulator RG3 can be switched by a single on/off signal.

According to the above-discussed embodiment, it is possible to provide a stable voltage to the CMOS inverter. Accordingly, even if the voltage between the input and output terminals 5 and 6 is drastically changed due to a momentary change of the load electrical current of the portable device 300, it is possible to prevent, by a simple structure formed by two elements (the transistor M1 and the condenser C1), an error in operation of the inverter, the error being where the input signal from the portable device 300 is not correctly transferred. In addition, since the condenser C1 is used and the electrical current does not flow in a direct current manner, the consumption of electrical current can be drastically reduced. Furthermore, since the number of the elements is small, the chip area is made small so that miniaturization of the protection IC and cost reduction can be easily made. In addition, it is possible to reduce the number of steps such as circuit verification in a design process due to miniaturization of the size of the circuit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

For example, in the above-discussed embodiment, a case where the input signal from the portable device 300 is transferred to the control part 50 by the protection IC 90 is discussed. However, the present invention can be applied to a case where the input signal form the control part 50 is transferred to the portable device 300 by the protection IC 90. In this case, in FIG. 2 and FIG. 3, the terminal 90*d* may be connected to the control part 50 side (the terminal 50*c* side of the control part 50), the terminal 90*c* may be connected to the portable device 300 side (communication terminal 7 side), and the terminal 90*b* connected to the ground terminal VSS may be connected to the negative side path 9*b* between the negative pole 4 of the rechargeable battery 200 and the transistor 2.

This patent application is based upon and claims the benefit of priority of Japanese Patent Application No. 2008-284765 filed on Nov. 5, 2008, the entire contents of which are incorporated herein by reference.

INDUSTRIAL APPLICABILITY

The present invention is applicable to communication devices and battery packs in which the communication devices are provided.

EXPLANATION OF REFERENCE SIGNS

50 CONTROL PART
90 BATTERY PROTECTION IC
100 BATTERY PACK
200 RECHARGEABLE BATTERY
300 PORTABLE DEVICE
M1 DEPLETION TYPE NMOS TRANSISTOR
M2 through M5 MOS TRANSISTOR
C1 CONDENSER
RG1, RG2, RG3 REGULATOR
IV INVERTER

The invention claimed is:
1. A communication device, comprising:
a CMOS inverter configured to transfer a signal, the signal being transferred and received between an electronic device and a control part able to communicate with the electronic device whose electric power supply is a rechargeable battery, said CMOS inverter including a P channel MOS transistor and a N channel MOS transistor, said P channel MOS transistor and said N channel MOS transistor having a common gate to which the signal from the electronic device is input, and a common drain for outputting an inverse signal of the signal from the electronic device; and
a regulator configured to generate a regulated voltage, the regulated voltage being formed by decreasing an electric power supply voltage of the electronic device,
wherein the regulator includes
a depletion type NMOS transistor where a drain is connected to a high electric potential side of the electric power supply voltage and a gate and a source are mutually connected, and
a capacitive element having an electrode connected to the source side of the depletion type NMOS transistor and another electrode connected to a low electric potential side of the electric power supply voltage, wherein
a voltage of the capacitive element is supplied between sources of the P channel MOS transistor and the N channel MOS transistor of the CMOS inverter.

2. The communication device as claimed in claim 1, wherein a back gate of the P channel MOS transistor of the inverter is connected to the high electric potential side of the electric power supply voltage.

3. The communication device as claimed in claim 1, further comprising:
a blocking part configured to block an electrical current flow from the depletion type NMOS transistor to the capacitive element.

4. The communication device as claimed in claim 3, further comprising:
a short-circuit part configured to make a short-circuit between both ends of the capacitive element in a time period during which the electric current flow is blocked by the blocking part.

5. A battery pack, comprising
the communication device as claimed in claim 1; and
the rechargeable battery,
wherein the communication device and the rechargeable battery are provided in the battery pack.

6. The communication device as claimed in claim 1, wherein the regulator is formed of a series circuit of the depletion type NMOS transistor and the capacitive element.

* * * * *